United States Patent
Sugiyama (10) Patent No.: US 9,088,701 B2
(45) Date of Patent: Jul. 21, 2015

(54) IMAGE FORMING APPARATUS, JOBS DISPLAY AND EXECUTION METHOD, AND RECORDING MEDIUM

(71) Applicant: KONICA MINOLTA, INC., Chiyoda-ku, Tokyo (JP)

(72) Inventor: Takanobu Sugiyama, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/546,809

(22) Filed: Nov. 18, 2014

(65) Prior Publication Data
US 2015/0172503 A1    Jun. 18, 2015

(30) Foreign Application Priority Data

Dec. 17, 2013 (JP) ................. 2013-260690

(51) Int. Cl.
G06K 15/00 (2006.01)
H04N 1/21 (2006.01)
H04N 1/00 (2006.01)

(52) U.S. Cl.
CPC ......... H04N 1/2179 (2013.01); H04N 1/00408 (2013.01)

(58) Field of Classification Search
CPC .......... H04N 1/00408; H04N 1/32539; H04N 1/00233; H04N 2201/3273; H04N 2201/3274
USPC .................................................. 358/1.1–3.29
See application file for complete search history.

(56) References Cited

U.S. PATENT DOCUMENTS

| 6,897,972 | B1 * | 5/2005 | Noda | 358/1.15 |
| 7,212,305 | B2 * | 5/2007 | Noda | 358/1.15 |
| 8,698,847 | B2 * | 4/2014 | Otani | 345/660 |
| 2008/0266601 | A1 * | 10/2008 | Narukawa et al. | 358/1.15 |
| 2010/0075198 | A1 * | 3/2010 | Ozaki et al. | 429/34 |
| 2010/0220355 | A1 * | 9/2010 | Sugiyama | 358/1.15 |
| 2013/0301068 | A1 * | 11/2013 | Yamada | 358/1.13 |

FOREIGN PATENT DOCUMENTS

| JP | 2000347818 A | 12/2000 |
| JP | 2008288733 A | 11/2008 |
| JP | 2011076381 A | 4/2011 |

* cited by examiner

*Primary Examiner* — Marcellus Augustin
(74) *Attorney, Agent, or Firm* — Holtz, Holtz, Goodman & Chick PC (57) ABSTRACT

An image forming apparatus includes: a display; a job input portion that inputs one or more jobs each having job and job reference information; a main memory; a job executor that executes the one or more jobs; a judgment portion that judges whether or not the one or more jobs can be executed; a first controller that stores the job and job reference information on the main memory if the one or more jobs can be executed or that stores the job and job reference information on the same and saves the job information on a recording device if the one or more jobs cannot be executed; a second controller that shows and updates a job name list and shows job details of a user's selected job name, all on the basis of the job reference information; and a third controller that restores the job information on the main memory.

11 Claims, 10 Drawing Sheets

| Jobs | Job Status Information | |
|---|---|---|
| C | Job No. | 471 |
| D | Paper Size | A3 |
| E | Resolution | High |
| F | Date and Time of Job Registration | 2013/2/18 20:15 |
| G | Date and Time for Job to Run | – |
| H | Number of Pages | 10 |
| | | Detail Information |

IMAGE FORMING APPARATUS, JOBS DISPLAY AND EXECUTION METHOD, AND RECORDING MEDIUM

This application claims priority under 35 U.S.C. §119 to Japanese Patent Application No. 2013-260690 filed on Dec. 17, 2013, the entire disclosure of which is incorporated herein by reference in its entirety.

BACKGROUND OF THE INVENTION

1. Field of the Invention

The present invention relates to: an image forming apparatus, i.e., a multi-function peripheral (MFP) such as a multifunctional digital machine; a jobs display and execution method to be implemented by the image forming apparatus; and a non-transitory computer-readable recording medium storing a jobs display and execution program for allowing a computer of the image forming apparatus to implement the jobs display and execution method.

2. Description of the Related Art

The following description sets forth the inventor's knowledge of related art and problems therein and should not be construed as an admission of knowledge in the prior art.

To reduce the product cost, an image forming apparatus may have a small capacity RAM as a main memory.

While executing an input job, for example, such an image forming apparatus often has a lack of sufficient RAM available for a subsequently input job, which is an unsolved problem.

Conventionally, as a solution to the lack of sufficient RAM available for the input job, there is a suggestion that the input job is saved on a non-volatile recording device such as a hard disk drive from the RAM (for example, Japanese Unexamined Patent Publication No. 2008-288733).

Meanwhile, in recent years, there suggested is an image forming apparatus that is configured to display a list of the name(s) of one or more jobs, which are input but not executed yet, on a display of an operation panel. This image forming apparatus is further configured to update the list in response to user manipulation, e.g., finger flicking on the display, and to show detail information of a job name selected from the list in response to user manipulation.

Since users instantly finish manipulation, e.g., finger flicking, this image forming apparatus is required to update the list on the display quickly; unless it does it quickly, a negative user experience could be caused. Similarly, this image forming apparatus is also required to show detail information of a selected job name quickly in response to user manipulation.

Even having the functions of: displaying a list of job names, updating the list, and showing detail information of a selected job, as described above, the conventional image forming apparatus, which is configured to save waiting jobs on a recording device form the RAM, still has a unsolved problem as described below.

In general, one job has: job information including image data to be subjected to job execution; and job reference information indicating job details such as job name. This means, the conventional image forming apparatus, which is configured to save waiting jobs on a recording device from the RAM, saves both job information and job reference information on a recording device from the RAM.

To display a list of job names or update the list on the display, the conventional image forming apparatus takes time to restore job names on the RAM from the recording device, which negatively affects the quickness of a response to user manipulation. Similarly, to display detail information of a selected job name, the conventional image forming apparatus takes time to restore the job reference information on the RAM from the recording device, which also negatively affects the quickness of a response to user manipulation. This is a problem in operability to be solved.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming apparatus including:

a display;

a job input portion that inputs one or more jobs each having job information and job reference information, the job information including image data to be subjected to job execution, the job reference information indicating job details including job name;

a main memory that is capable of storing the job information and the job reference information temporarily, upon the one or more jobs being input by the job input portion;

a job executor that reads the job information out of the main memory to execute the one or more jobs;

a judgment portion that judges whether or not the one or more jobs being input by the job input portion can be executed by the job executor;

a first controller that stores both the job information and the job reference information on the main memory, if the judgment portion judges that the one or more jobs can be executed or that stores both the job information and the job reference information on the main memory, and further saves the job information on a recording device from the main memory, in the state the job information and the job reference information are connected with each other, if the judgment portion judges that the one or more jobs cannot be executed;

a second controller that shows, in accordance with user manipulation, a job name list of the one or more jobs on the display on the basis of the job reference information stored on the main memory, the one or more jobs being unable to be executed; that updates, in accordance with user manipulation, the job name list on the display on the basis of the job reference information stored on the main memory; and that shows job details of a specific job name on the display on the basis of the job reference information stored on the main memory, the specific job name being selected by a user from the job name list; and a third controller that restores the job information on the main memory from the recording device to execute the one or more jobs by the job executor, the one or more jobs becoming able to be executed after the job information is saved on the recording device from the main memory.

A second aspect of the present invention relates to a jobs display and execution method to be implemented by an image forming apparatus including a display and a main memory, the method including:

inputting one or more jobs each having job information and job reference information, the job information including image data to be subjected to job execution, the job reference information indicating job details including job name;

storing the job information and the job reference information temporarily on the main memory, upon the one or more jobs being input;

reading the job information out of the main memory to execute the one or more jobs;

judging whether or not the one or more jobs being input can be executed;

storing both the job information and the job reference information on the main memory, if it is judged that the one or more jobs can be executed or storing both the job information and the job reference information on the main memory, and further saves the job information on a recording device from the main memory, in the state the job information and the job reference information are connected with each other, if it is judged that the one or more jobs cannot be executed;

showing, in accordance with user manipulation, a job name list of the one or more jobs on the display on the basis of the job reference information stored on the main memory, the one or more jobs being unable to be executed; updating, in accordance with user manipulation, the job name list on the display on the basis of the job reference information stored on the main memory; and showing job details of a specific job name on the display on the basis of the job reference information stored on the main memory, the specific job name being selected by a user from the job name list; and restoring the job information on the main memory from the recording device to execute the one or more jobs, the one or more jobs becoming able to be executed after the job information is saved on the recording device from the main memory.

A third aspect of the present invention relates to a non-transitory computer-readable recording medium having a jobs display and execution program for allowing a computer of an image forming apparatus including a display and a main memory, to execute:

inputting one or more jobs each having job information and job reference information, the job information including image data to be subjected to job execution, the job reference information indicating job details including job name;

storing the job information and the job reference information temporarily on the main memory, upon the one or more jobs being input;

reading the job information out of the main memory to execute the one or more jobs;

judging whether or not the one or more jobs being input can be executed;

storing both the job information and the job reference information on the main memory, if it is judged that the one or more jobs can be executed or storing both the job information and the job reference information on the main memory, and further saves the job information on a recording device from the main memory, in the state the job information and the job reference information are connected with each other, if it is judged that the one or more jobs cannot be executed;

showing, in accordance with user manipulation, a job name list of the one or more jobs on the display on the basis of the job reference information stored on the main memory, the one or more jobs being unable to be executed; updating, in accordance with user manipulation, the job name list on the display on the basis of the job reference information stored on the main memory; and showing job details of a specific job name on the display on the basis of the job reference information stored on the main memory, the specific job name being selected by a user from the job name list; and restoring the job information on the main memory from the recording device to execute the one or more jobs, the one or more jobs becoming able to be executed after the job information is saved on the recording device from the main memory.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying figures.

Figure 1:
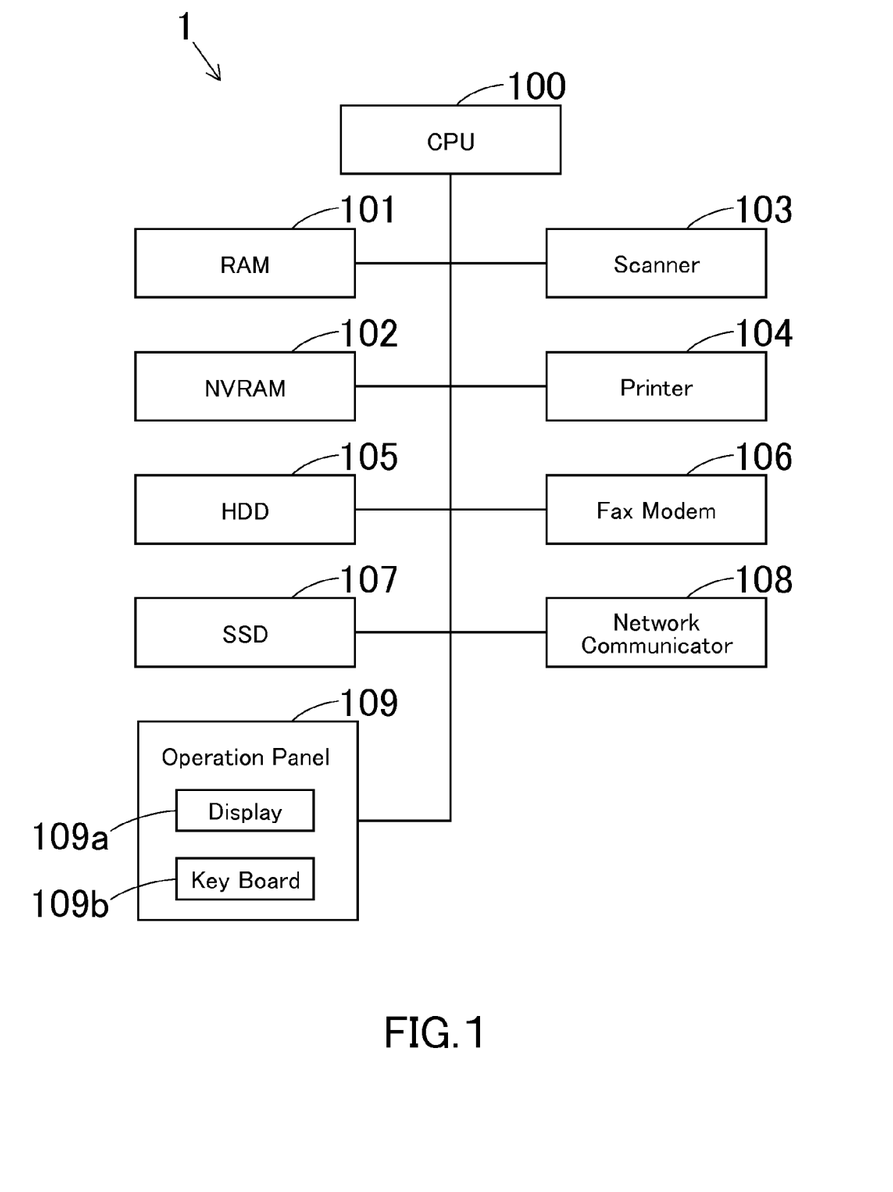
FIG. 1 is a block diagram illustrating a basic configuration of an image forming apparatus according to one embodiment of the present invention.

FIG. 1 is a block diagram illustrating a basic configuration of an image forming apparatus 1 according to one embodiment of the present invention. In this embodiment, a MFP having various functions such as a copier function, a printer function, and a scanner function, as described above, is employed as the image forming apparatus 1.

The image forming apparatus 1 is provided with: a CPU 100; a random access memory (RAM) 101; a non-volatile random access memory (NVRAM) 102; a scanner 103; a printer 104; a memory device 105; a facsimile (fax) modem 106; a solid state drive (SSD) 107; a network communicator 108; an operation panel 109; and others.

The CPU 100 controls the entire image forming apparatus 1 in a unified and systematic manner by executing operation programs stored on a recording medium such as the NVRAM 102 and the memory device 105. Specifically, the CPU 100 executes basic functions of the image forming apparatus 1, such as a copier function, a printer function, and a scanner function. In this embodiment, the CPU 100 further performs the following operations: judging whether or not an input job can be executed; storing, on the RAM 101, job reference information including job name and job information including image data (or document data) to be subjected to job execution, both of which are included in the input job; and saving only the job information on the memory device 105 from the RAM 101 depending on the judgment result. These control operations will be later described in detail.

The RAM 101 is a main memory that provides a work area for the CPU 100 to execute operation programs. The RAM 101 stores job reference information and job information of input jobs, temporarily. In this embodiment, a small capacity RAM is employed as the RAM 101 from the aspect of reduction in product cost.

The NVRAM 102 is a memory that stores settings information of the image forming apparatus 1, operation programs for the CPU 100, and others.

The scanner 103 converts physical documents into digital images by document scanning. The obtained document images may be printed in accordance with a print job, transmitted to a network via file transfer protocol (FTP) or electronic mail in accordance with a network scan job, and transmitted via a fax line in accordance with a fax transmission job. The scanner 103 serves as a job input portion.

The printer 104 prints document images obtained by the scanner 103, document files received externally from user terminals, and others on paper.

The memory device 105 is comprised of a non-volatile recording medium such as a hard disk drive (HDD); the memory device 105 stores various types of data and also stored document images and others being organized in folders. The memory device 105 has one or more boxes, i.e., memory areas, in which document files and others can be organized. Users are allowed to select a document file or other from the boxes by operating the operation panel 109 and to give a print job, for example, on the selected document file also by operating the operation panel 109. That is, the operation panel 109 can serve as a job input portion. Hereinafter, the memory device 105 will be also referred to as "HDD" for simplicity purposes.

When an input job cannot be executed, only the job information is saved on the HDD 105 from the RAM 101, which will be later described in detail.

The fax modem 106 serves for transmitting and receiving document images via a fax line. The image forming apparatus 1 has one or more fax lines.

The SSD 107 serves as a connector to which an external recording medium such as a flash memory device is connected.

The network communicator 108 is an interface that supports local area network (LAN) communication, for example, with external apparatuses such as user terminals not shown in the figure via a network protocol. That is, the network communicator 108 serves as a job input portion that inputs print jobs and others received from the user terminals, for example.

The operation panel 109 is a user interface that allows users to perform operations and view messages for users, the status of the image forming apparatus 1, and other information. The operation panel 109 is provided with: a display 109a that is comprised of a liquid-crystal touch-panel display apparatus; and a key board 109b having various hardware keys such as a start key, a stop key, and numeric keys.

Various jobs can be input to the image forming apparatus 1 according to one embodiment; they are for example: print jobs for allowing the printer 104 to print images obtained by the scanner 103, document files stored on the HDD 105, and document files received externally; network scan jobs for transmitting to network images and others obtained by the scanner 103; and fax transmission jobs for transmitting via a fax line images and others obtained by the scanner 103, as described above.

Each of such jobs includes job information and job reference information. Job information includes image data to be subjected to job execution, the image data includes a document image obtained by the scanner 103 or a document file to be subjected to printing which is received externally from user terminals and others. Job information is a great size of information. Job reference information indicates job details and is a small size of information. Job reference information includes job name, at least. Job names are automatically generated by the image forming apparatus 1 by a well-known method.

Job reference information, in this embodiment, further includes job number and date and time of job registration. More specifically, job reference information of a print job further includes color (whether full-color printing or black-and-white printing), paper size, number of pages, and print side (whether single-sided printing or both-sided printing); job reference information of a facsimile transmission job further includes fax number, paper size, and number of pages; and job reference information of a network scan job further includes resolution, number of pages, and a destination address (electronic mail address or IP address).

This does not mean that job reference information should be limited to the aforementioned examples; instead it should be understood that job reference information preferably includes more than one of the following: job number, paper size, resolution, date and time of job registration, and number of pages, as well as job name.

Figure 2:
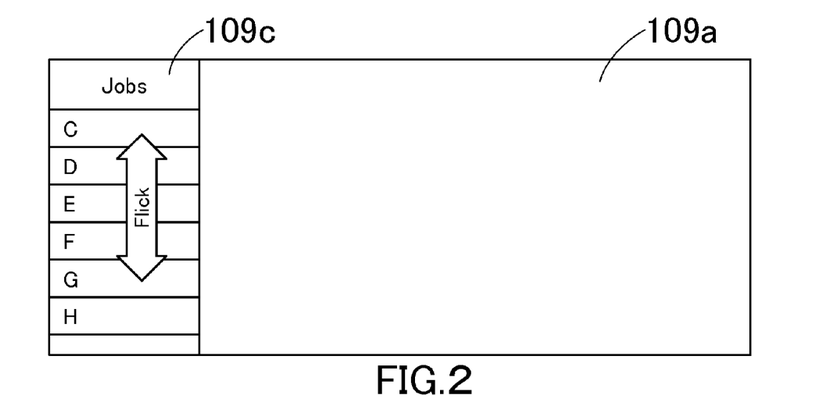
FIG. 2 illustrates a job name list shown on a display of an operation panel.

The image forming apparatus 1, in this embodiment, is configured to display the names of input and unexecuted jobs in a list form on the display 109a of the operation panel 109 in accordance with user manipulation.

FIG. 2 illustrates a job name list shown on the display 109a of the operation panel 109.

As illustrated in FIG. 2, job names (represented by capital letters C to H) are shown vertically in a list form in a list display area 109c that is indicated by a side banner of the display 109a. When there are too many job names to show in the limited field of the display 109a, users can update the job name list and view such job names by operating the list display area 109c. For example, as illustrated in FIG. 2, the job name list can be scrolled upward or downward in conjunction with a user flicking the finger on the operation panel 109. In this way, users can view job names hidden before or after the job names C to H.

Figure 3:
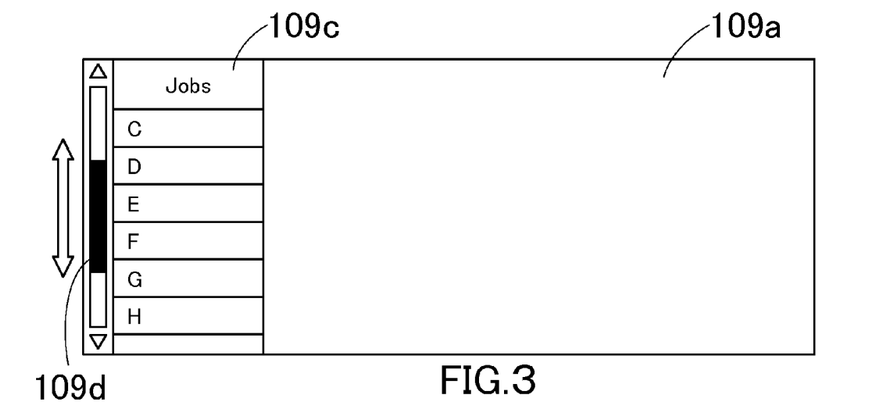
FIG. 3 is an explanatory view of how to update the job name list.

It should be understood that users do not necessarily perform a flick gesture to update the job name list. Alternatively, as illustrated in FIG. 3, users may scroll the job name list by a scroll bar 109d that is provided by the side of the list display area 109c. Still alternatively, users may turn pages of the job name list by a next page button and a previous page button that are provided in the list display area 109*c*, although these buttons are not shown in the figure.

Figure 4:
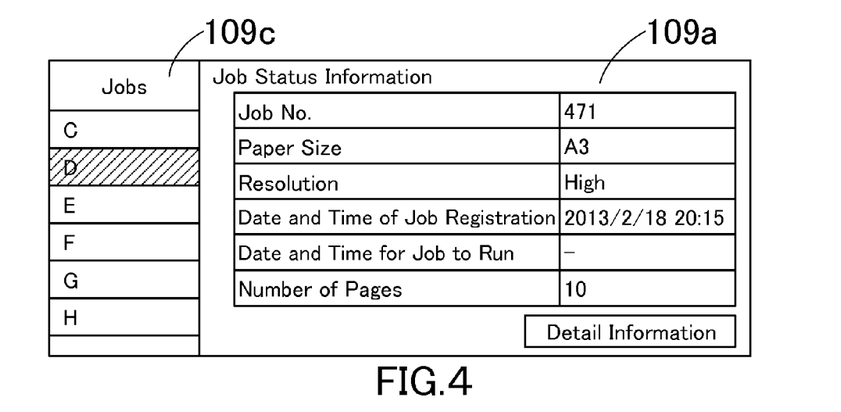
FIG. 4 illustrates a screen via which a user selects one of the job names on the display.

FIG. 4 illustrates that, when a user selects one of the job names on the display 109*a*, status information indicating job details of the selected job name is shown on the display 109*a*. In the example of FIG. 4, the selected job name "D" is indicated by hatching and the corresponding status information is shown in a side field of the list display area 109*c*. In the example of FIG. 4, status information indicates: job number, paper size, resolution, date and time of job registration, and number of pages. Status information is the entire or a part of job reference information. Status information may indicate different information depending on the model of the image forming apparatus 1.

Display screens for the job name list and status information are produced by the CPU 100 of the image forming apparatus 1 on the basis of job reference information included in jobs. Unless the image forming apparatus 1 updates the job name list quickly or shows status information of a selected job name quickly in response to user manipulation, a negative user experience could be caused.

Meanwhile, in this embodiment, a small capacity RAM is employed as the RAM 101 from the aspect of reduction in product cost, thus the image forming apparatus 1 often needs to wait to store one or more input jobs while executing another job because of a lack of sufficient RAM available for the input jobs, which is inconvenient.

As a solution to the problem, in this embodiment, the CPU 100 judges whether or not the input jobs can be executed. If the input jobs can be executed, the CPU 100 stores on the RAM 101 both the job reference information and the job information; if the input jobs cannot be executed, the CPU 100 stores on the RAM 101 both the job reference information and the job information, then saves only the job information, whose size is great, on a recording medium such as the HDD 105 in the state the job reference information and the job information are connected with each other, and removes the job information from the RAM 101 while continuously storing the job reference information, whose size is small, on the RAM 101.

As described above, regardless of the judgment whether or not the input jobs can be executed, the image forming apparatus 1 stores the job reference information on the RAM 101. Thus, with use of the job names and the job reference information stored on the RAM, the image forming apparatus 1 shows a job name list on the display 109*a* quickly, updates the job name list quickly in response to finger flicking, and shows status information of a selected job name quickly in response to user manipulation. This is a cost-saving image forming apparatus that saves waiting jobs on a recording medium such as the HDD 105 from the RAM 101; at the same time, this is also an agile image forming apparatus that updates the job name list quickly and shows status information quickly in response to user manipulation. Consequently, this is a good image forming apparatus that contributes to a positive user experience for the quickness to a response to user manipulation.

In this embodiment, the image forming apparatus 1 judges that input jobs cannot be executed, i.e., the image forming apparatus 1 determines to save job information on the HDD 105 in the following cases (1) to (6).

(1) Fax Transmission Jobs

Figure 5:
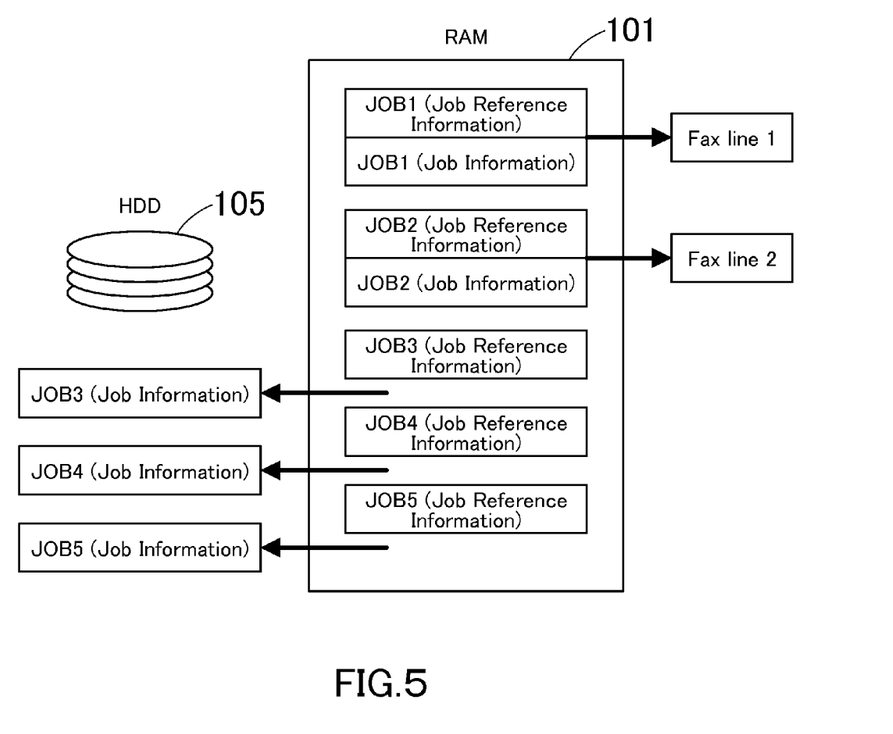
FIG. 5 is an explanatory view of an operation to be performed by an image forming apparatus having two fax lines when a fax transmission job is input.

As illustrated in FIG. 5, a fax transmission job 1 is input to the image forming apparatus 1 having two fax lines. When a fax transmission job 1 is input, the image forming apparatus 1 stores the job reference information and the job information on the RAM 101 and executes the fax transmission job 1 by one of the two fax lines.

When a fax transmission job 2 is further input, the image forming apparatus 1 stores the job reference information and the job information on the RAM 101 and executes the fax transmission job 2 by the other one of the two fax lines.

Figure 6:
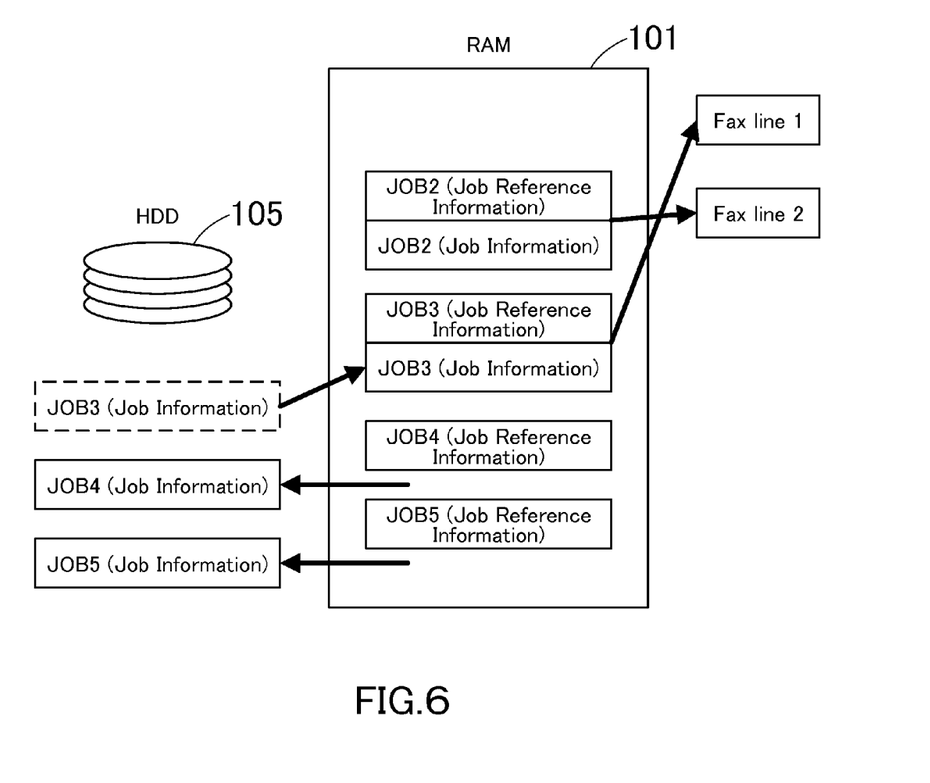
FIG. 6 is an explanatory view of an operation to be performed by the image forming apparatus when fax transmission jobs are input.

While executing the fax transmission jobs 1 and 2, the image forming apparatus 1 may further receive a fax transmission job 3. In this case, the image forming apparatus 1 needs to wait to execute the fax transmission job 3 till any of the two fax lines is free.

The image forming apparatus 1 thus stores both the job reference information and the job information on the RAM 101, then saves only the job information on the HDD 105 and removes it from the RAM 101 while continuously storing the job reference information on the RAM 101. The same is true for the case in which the image forming apparatus 1 further receive fax transmission jobs 4 and 5 after the fax transmission bob 3.

Upon finish of the fax transmission job 1, one of the two fax lines is free. Now the image forming apparatus 1 can execute the fax transmission job 3 waiting at the next position; the CPU 100 restores the job information of the fax transmission job 3 on the RAM 101 from the HDD 105 and executes the fax transmission job 3 by the free fax line.

The same is true for the fax transmission jobs 4 and 5 waiting at the next position and further next position: as soon as one of the two fax lines is free, the CPU 100 restores the job information on the RAM 101 from the HDD 105 and performs job execution.

Figure 7:
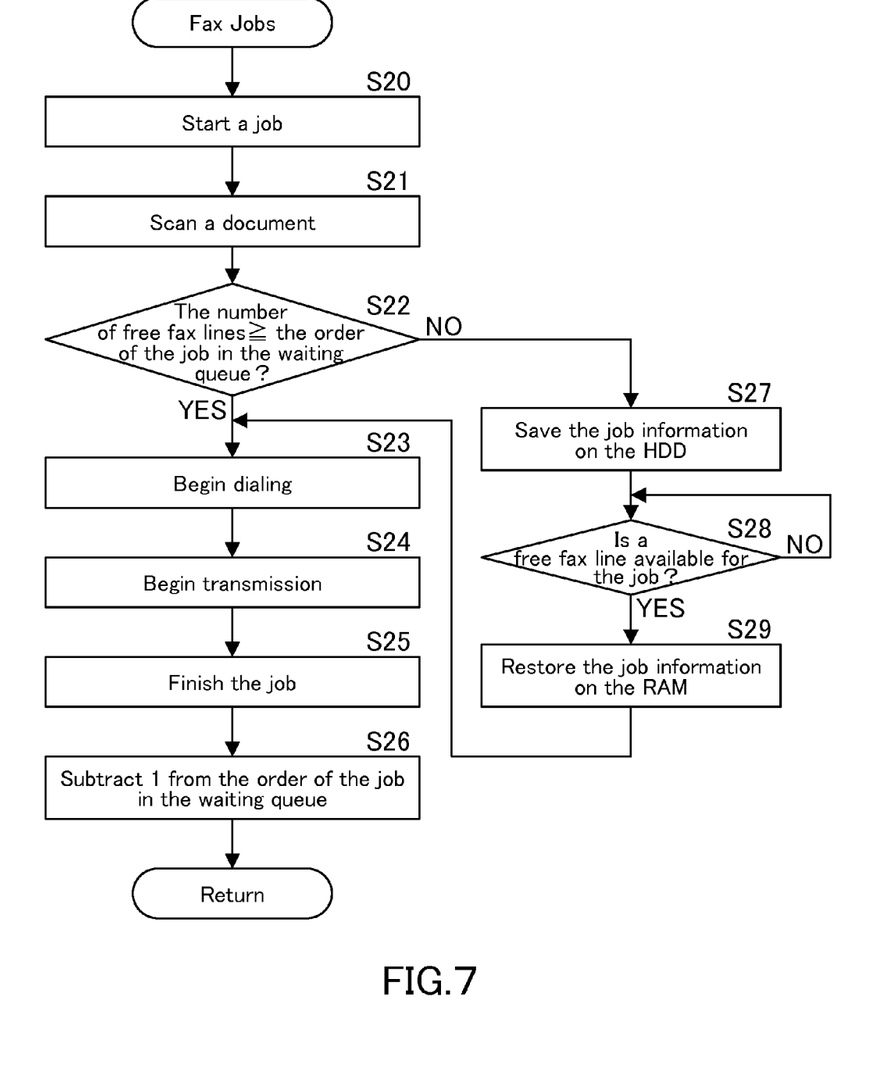
FIG. 7 is a flowchart representing how a document image obtained by a scanner is transmitted to a predetermined address via a fax line when a fax transmission job is input.

FIG. 7 is a flowchart representing how a document image obtained by the scanner 103 is transmitted to a predetermined address via a fax line when a fax transmission job is input. The flowchart of FIG. 7 and each of the following flowcharts to be described herein are executed by the CPU 100 in accordance with an operation program stored on the NVRAM 101 or the HDD 105.

In Step S20, a user's manipulation to start a job is received; in Step S21, a document image is obtained by the scanner 103 and both image data (job information) and job reference information of the document image are stored on the RAM 101.

In Step S22, it is judged whether or not the number of free fax lines is equal to greater than the order of the job in the waiting queue. That is, it is judged whether or not the image forming apparatus 1 can execute the job. If the number of free fax lines is equal to or greater than the order of the job in the waiting queue (YES in Step S22), dialing a number begins in Step S23 and transmission begins in Step S24.

In Step S25, the job is finished; in Step S26, 1 is subtracted from the order of the job in the waiting queue. After that, the routine returns for the job waiting at the next position.

Back to Step S22, if the number of free fax lines is not equal to or greater than the order of the job in the waiting queue (NO in Step S22), then in Step S27, only the job information connected with the job reference information is saved on the HDD 105 and removed from the RAM 101 in order to keep a sufficient memory available on the RAM 101, while the job reference information is continuously stored on the RAM 101.

In Step S28, the routine waits till a free fax line is available for the job (NO in Step S28); if a free fax line is available for the job (YES in Step S28), the job information is restored on the RAM 101 from the HDD 105 in Step S29. Subsequently, dialing begins in Step S23 and the job information is transmitted in Step S24.

Fax transmission jobs should not be limited to tasks for transmitting a document image obtained by the scanner 103 via a fax line; fax transmission jobs also may be tasks for transmitting a document file stored on the HDD 105 via a fax line.

(2) Network Scan Jobs

Figure 8:
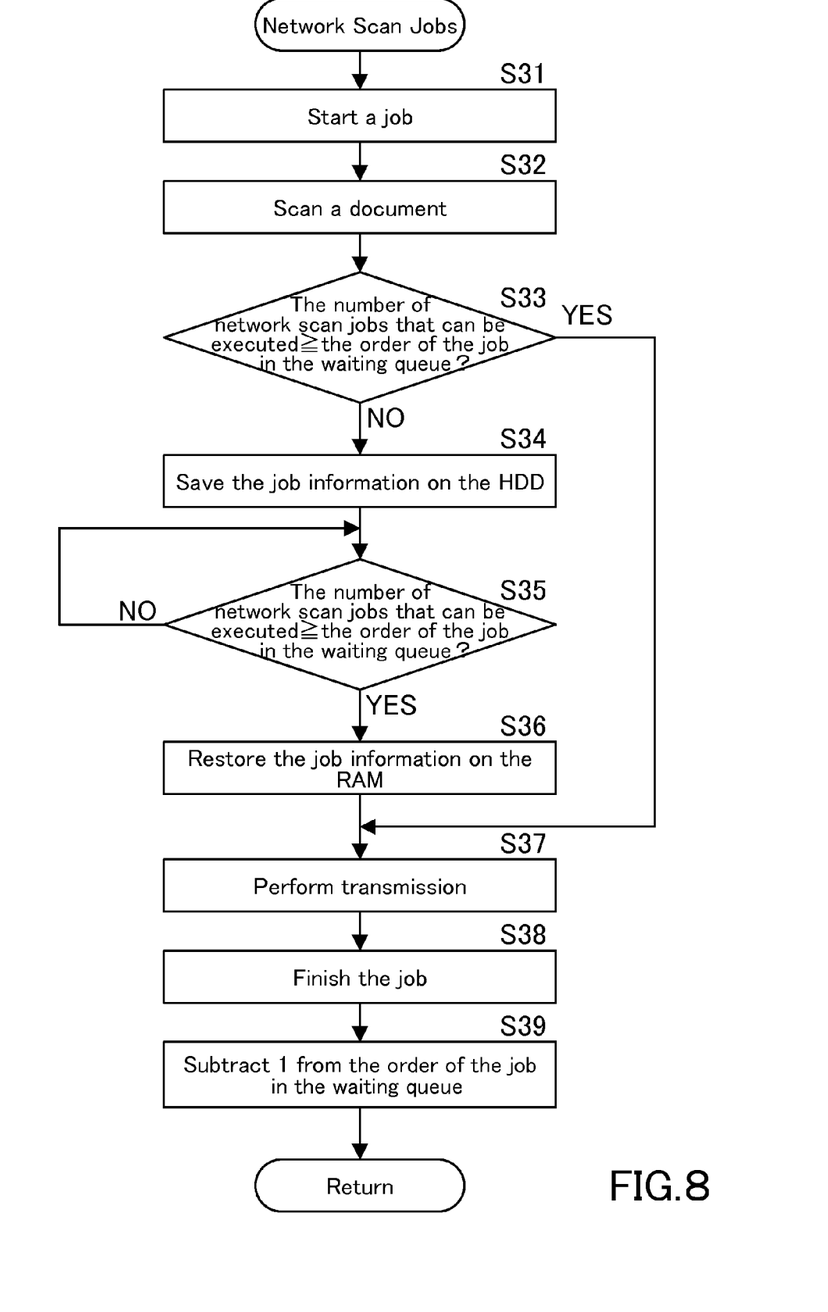
FIG. 8 is a flowchart representing how a document image obtained by a scanner is transmitted to a predetermined address via a network when a network scan job is input.

In this embodiment, when the number of input network scan jobs is greater than the number of network scan jobs which the image forming apparatus 1 can execute, the image forming apparatus 1 saves only the job information on the HDD 105 from the RAM 101 while continuously storing the job reference information on the RAM 101.

FIG. 8 is a flowchart representing how a document image obtained by the scanner 103 is transmitted to a predetermined address via a network when a network scan job is input.

In Step S31, a user's manipulation to start a job is received; in Step S32, a document image is obtained by the scanner 103 and both image data (job information) and job reference information of the document image are stored on the RAM 101.

In Step S33, it is judged whether or not the number of network scan jobs that can be executed is equal to or greater than the order of the job in the waiting queue. That is, it is judged whether or not the image forming apparatus 1 can execute the job. If the number of network scan jobs that can be executed is not equal to or greater than the order of the job in the waiting queue (NO in Step S33), then in Step S34, only the job information connected with the job reference information is saved on the HDD 105 and removed from the RAM 101 in order to keep a sufficient memory available on the RAM 101, while the job reference information is continuously stored on the RAM 101.

In Step S35, the routine waits till the number of network scan jobs that can be executed is equal to or greater than the order of the job in the waiting queue (NO in Step S35); if it is equal to or greater than the order of the job in the waiting queue (YES in Step S35), the job information is restored on the RAM 101 from the HDD 105 in Step S36. Subsequently, the job information is transmitted to a specified address in Step S37.

In Step S38, the job is finished; in Step S39, 1 is subtracted from the order of the job in the waiting queue. After that, the routine returns for the job waiting at the next position.

Back to Step S33, if the number of network scan jobs that can be executed is equal to or greater than the order of the job in the waiting queue (YES in Step S33), the job information is transmitted in Step S37 without being saved on the HDD 105.

Network scan jobs should not be limited to tasks for transmitting a document image obtained by the scanner 103 via a network; network scan jobs also may be tasks for transmitting a document file stored on the HDD 105 by electronic mail and others.

(3) Print (Copy) Jobs

Figure 9:
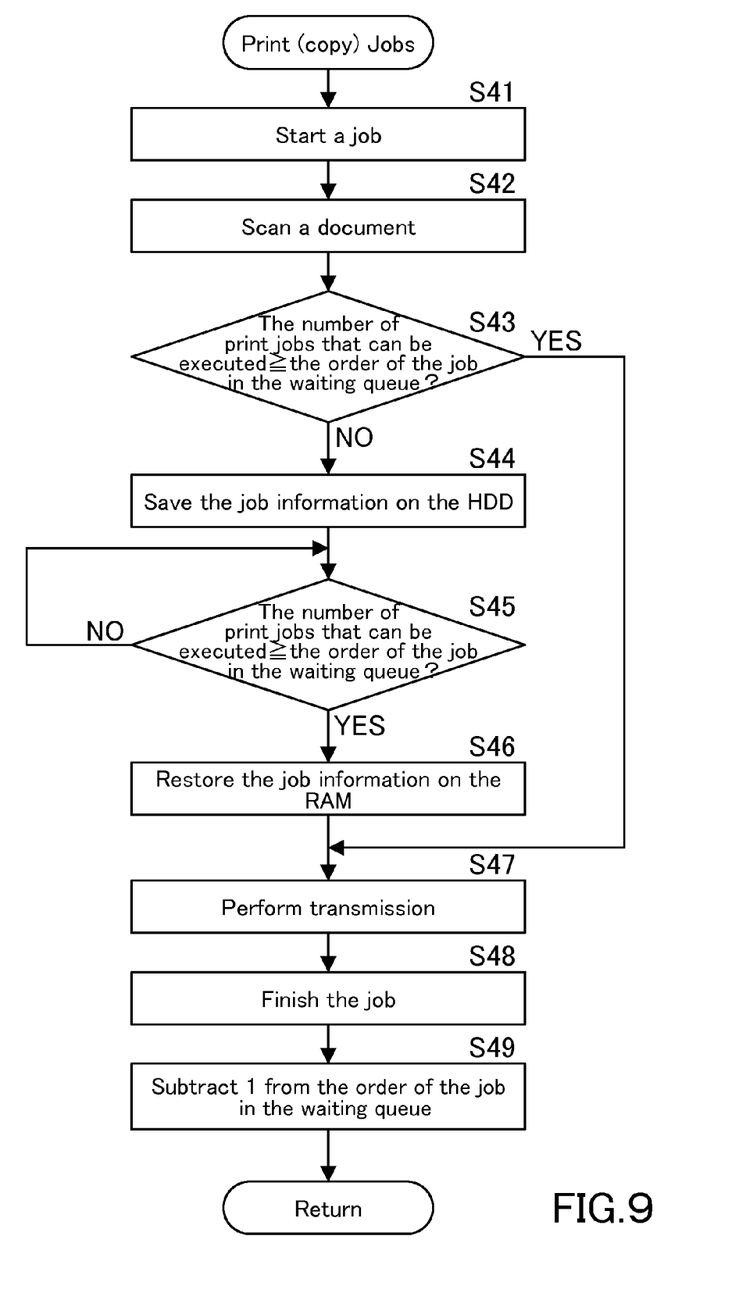
FIG. 9 is a flowchart representing how a document image obtained by a scanner is printed when a print job is input.

In this embodiment, when the number of input print jobs is greater than the number of print jobs which the image forming apparatus 1 can execute, the image forming apparatus 1 saves only the job information on the HDD 105 from the RAM 101 while continuously storing the job reference information on the RAM 101.

FIG. 9 is a flowchart representing how a document image obtained by the scanner 103 is printed when a print job is input.

In Step S41, a user's manipulation to start a job is received; in Step S42, a document image is obtained by the scanner 103 and both image data (job information) and job reference information of the document image are stored on the RAM 101.

In Step S43, it is judged whether or not the number of print jobs that can be executed is equal to or greater than the order of the job in the waiting queue. That is, it is judged whether or not the image forming apparatus 1 can execute the job. If the number of print jobs that can be executed is not equal to or greater than the order of the job in the waiting queue (NO in Step S43), then in Step S44, only the job information connected with the job reference information is saved on the HDD 105 and removed from the RAM 101 in order to keep a sufficient memory available on the RAM 101, while the job reference information is continuously stored on the RAM 101.

In Step S45, the routine waits till the number of print jobs that can be executed is equal to or greater than the order of the job in the waiting queue (NO in Step S45); if it is equal to or greater than the order of the job in the waiting queue (YES in Step S45), the job information is restored on the RAM 101 from the HDD 105 in Step S46. Subsequently, the job information is printed by the printer 104 in Step S47.

In Step S48, the job is finished; in Step S49, 1 is subtracted from the order of the job in the waiting queue. After that, the routine returns for the job waiting at the next position.

Back to Step S43, if the number of print jobs that can be executed is equal to or greater than the order of the job in the waiting queue (YES in Step S43), the job information is printed in Step S47 without being saved on the HDD 105.

Print jobs should not be limited to tasks for printing a document image obtained by the scanner 103; print jobs also may be tasks for printing a document file stored on the HDD 105 and tasks for printing a document file received externally from a user terminal, for example.

(4) Timer Jobs

Figure 10:
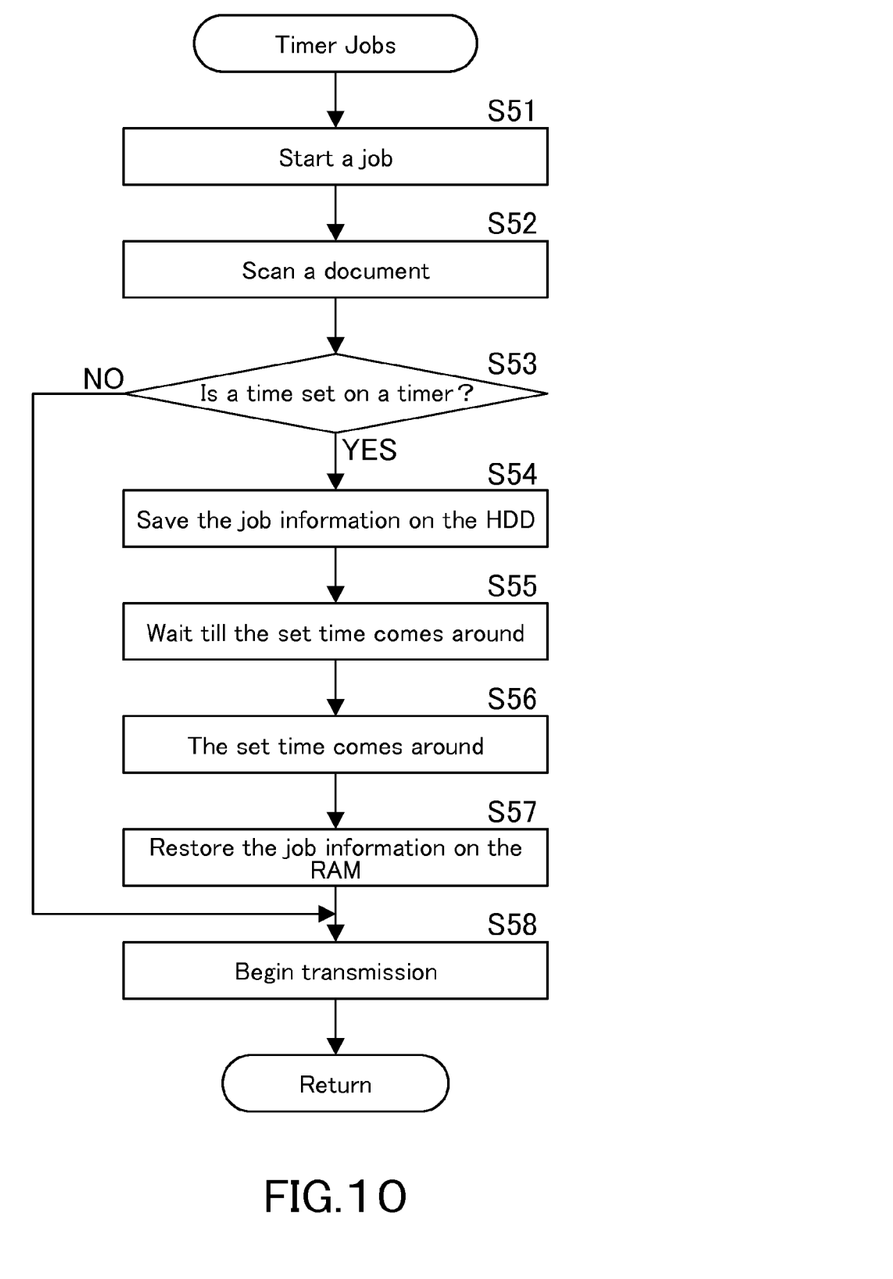
FIG. 10 is a flowchart representing how a document image obtained by a scanner is transmitted to a predetermined address at a time set on a timer when a timer job is input.

In this embodiment, the image forming apparatus 1 is capable of starting job execution at a time set on a timer. When an input job needs to wait till a set time, the image forming apparatus 1 saves only the job information on the HDD 105 from the RAM 101 while continuously storing the job reference information on the RAM 101.

FIG. 10 is a flowchart representing how a document image obtained by the scanner 103 is transmitted to a predetermined address at a time set on a timer when a timer job is input.

In Step S51, a user's manipulation to start a job is received; in Step S52, a document image is obtained by the scanner 103 and both image data (job information) and job reference information of the document image are stored on the RAM 101.

In Step S53, it is judged whether or not a time is set on a timer. That is, it is judged whether or not the image forming apparatus 1 can execute the job. If a time is set on a timer (YES in Step S53), then in Step S54, only the job information connected with the job reference information is saved on the HDD 105 and removed from the RAM 101 in order to keep a sufficient memory available on the RAM 101, while the job reference information is continuously stored on the RAM 101.

In Step S55, the routine waits till the set time comes around. The set time comes around in Step S56, then the job information is restored on the RAM 101 from the HDD 105 in Step S57. Subsequently, the job information is transmitted in Step S58.

Back to Step S53, if no time is set on a timer (NO in Step S43), the job information is transmitted in Step S58 without being saved on the HDD 105.

Timer jobs should not be limited to tasks for transmitting a document image at a time set on a timer; timer jobs also may be tasks for printing a document image at a time set on a timer, for example.

(5) In Case of an Internal Error

Figure 11:
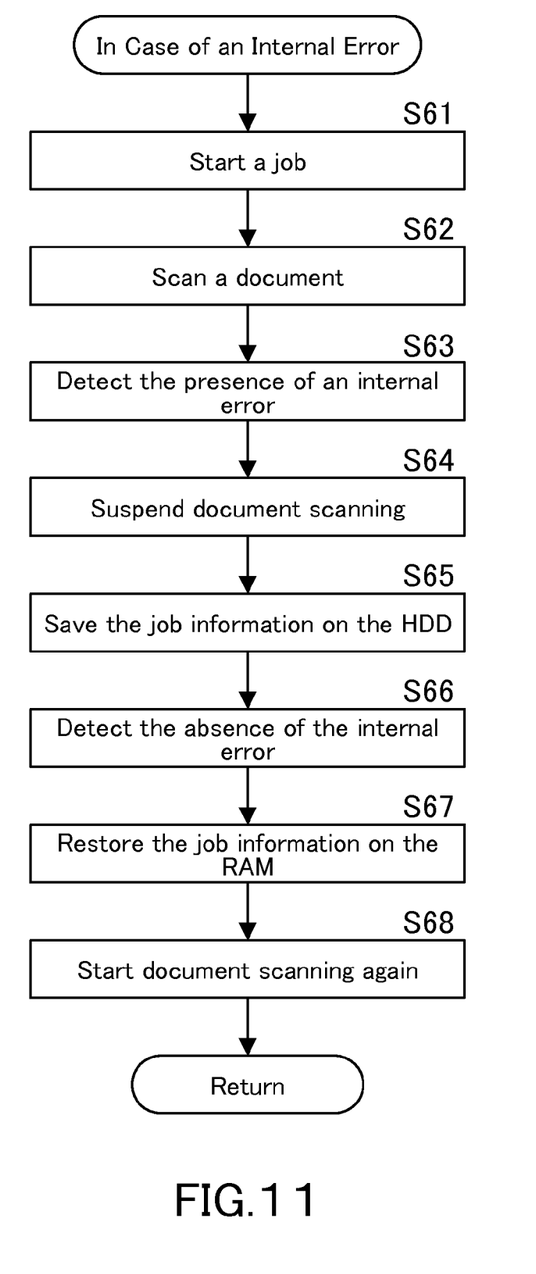
FIG. 11 is a flowchart representing an operation to be performed when an internal error occurs during document scanning by a scanner.

In this embodiment, when an input job needs to wait because of an internal error, the image forming apparatus 1 saves only the job information on the HDD 105 from the RAM 101 while continuously storing the job reference information on the RAM 101.

FIG. 11 is a flowchart representing an operation to be performed when an internal error occurs during document scanning by the scanner 103.

In Step S61, a user's manipulation to start a job is received; in Step S62, a document image is obtained by the scanner 103 and both image data (job information) and job reference information of the document image are stored on the RAM 101.

In Step S63, the presence of an internal error is detected. Document scanning is suspended in Step S64 because the job cannot be executed; in Step S65, only the job information connected with the job reference information is saved on the HDD 105 and removed from the RAM 101 in order to keep a sufficient memory available on the RAM 101, while the job reference information is continuously stored on the RAM 101.

In Step S66, the absence of the internal error is detected; the job information is restored on the RAM 101 from the HDD 105 in Step S67. Subsequently, document scanning gets started again in Step S68.

The input job that needs to wait because of an internal error should not be limited to specific jobs; it may be print jobs, for example.

(6) In Case of Stop Operation

Figure 12:
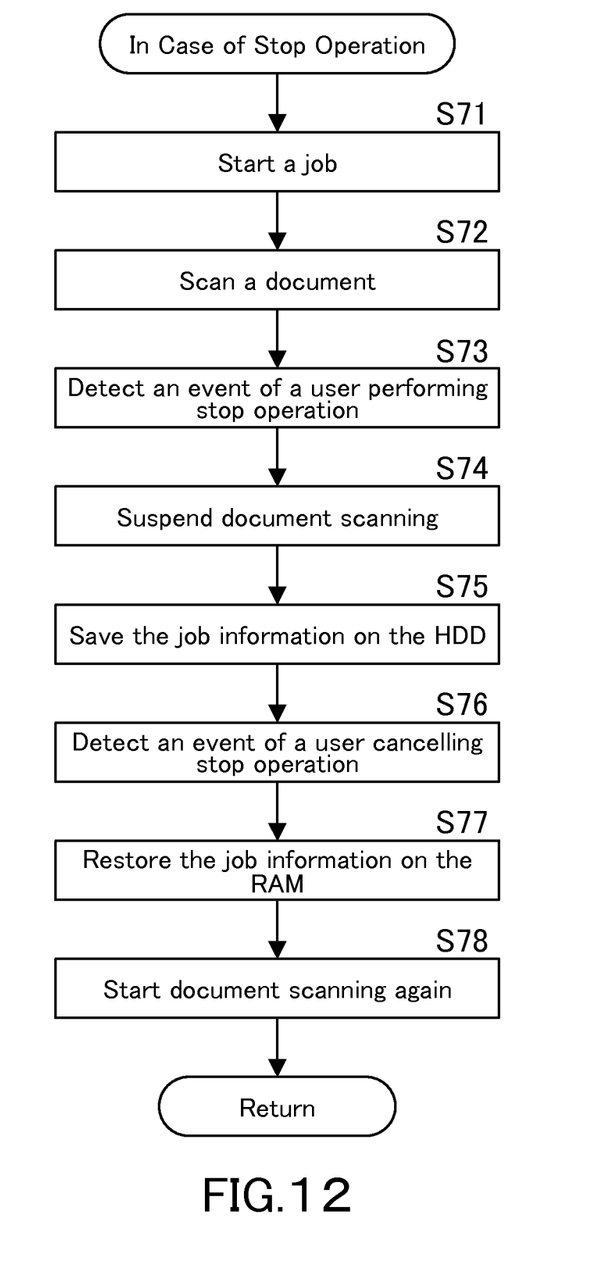
FIG. 12 is a flowchart representing an operation to be performed when a user performs stop operation during document scanning by a scanner.

In this embodiment, when an input job needs to wait because of a user's stop operation, e.g., pressing a stop key, the image forming apparatus 1 saves only the job information on the HDD 105 from the RAM 101 while continuously storing the job reference information on the RAM 101.

FIG. 12 is a flowchart representing an operation to be performed when a user performs stop operation during document scanning by the scanner 103.

In Step S71, a user's manipulation to start a job is received; in Step S72, a document image is obtained by the scanner 103 and both image data (job information) and job reference information of the document image are stored on the RAM 101.

In Step S73, an event of a user performing stop operation is detected. Document scanning is suspended in Step S74 because the job cannot be executed; in Step S75, only the job information connected with the job reference information is saved on the HDD 105 and removed from the RAM 101 in order to keep a sufficient memory available on the RAM 101, while the job reference information is continuously stored on the RAM 101.

In Step S76, an event of a user cancelling stop operation is detected; the job information is restored on the RAM 101 from the HDD 105 in Step S77. Subsequently, document scanning gets started again in Step S78.

The input job that needs to wait because of stop operation should not be limited to specific jobs; it may be print jobs, for example.

While one embodiment of the present invention has been described in detail herein and shown in the accompanying drawings, it should be understood that the present invention is not limited to the foregoing embodiment.

For example, in the embodiment, the image forming apparatus 1 determines to wait to execute an input job in the cases (1) to (6). The image forming apparatus 1 may determine to wait to execute an input job in any one of the cases (1) to (6) or in a combination of two or more of the foregoing.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
   a display;
   a job input portion that inputs one or more jobs each having job information and job reference information, the job information including image data to be subjected to job execution, the job reference information indicating job details including job name;
   a main memory that is capable of storing the job information and the job reference information temporarily, upon the one or more jobs being input by the job input portion;
   a job executor that reads the job information out of the main memory to execute the one or more jobs;
   a judgment portion that judges whether or not the one or more jobs being input by the job input portion can be executed by the job executor;

a first controller that stores both the job information and the job reference information on the main memory, if the judgment portion judges that the one or more jobs can be executed or that stores both the job information and the job reference information on the main memory, and further saves the job information on a recording device from the main memory, in the state the job information and the job reference information are connected with each other, if the judgment portion judges that the one or more jobs cannot be executed;

a second controller that shows, in accordance with user manipulation, a job name list of the one or more jobs on the display on the basis of the job reference information stored on the main memory, the one or more jobs being unable to be executed; that updates, in accordance with user manipulation, the job name list on the display on the basis of the job reference information stored on the main memory; and that shows job details of a specific job name on the display on the basis of the job reference information stored on the main memory, the specific job name being selected by a user from the job name list; and a third controller that restores the job information on the main memory from the recording device to execute the one or more jobs by the job executor, the one or more jobs becoming able to be executed after the job information is saved on the recording device from the main memory.

2. The image forming apparatus as recited in claim 1, wherein the job reference information includes more than one of the following: job number, paper size, resolution, date and time of job registration, and number of pages, as well as job name.

3. The image forming apparatus as recited in claim 1, wherein, when an input network scan job needs to wait for another network scan job to finish, the judgment portion judges that the input network scan job cannot be executed.

4. The image forming apparatus as recited in claim 1, wherein, when an input facsimile job needs to wait till a free facsimile line is available, the judgment portion judges that the input facsimile job cannot be executed.

5. The image forming apparatus as recited in claim 1, wherein, when an input print job needs to wait for another print job to finish, the judgment portion judges that the input print job cannot be executed.

6. The image forming apparatus as recited in claim 1, further comprising a timer that schedules the one or more jobs to run at a set time, wherein, when an input job needs to wait till the time set on the timer, the judgment portion judges that the input job cannot be executed.

7. The image forming apparatus as recited in claim 1, wherein, when an input job needs to wait because of an internal error, the judgment portion judges that the input job cannot be executed.

8. The image forming apparatus as recited in claim 1, wherein, when an input job needs to wait because of stop operation, the judgment portion judges that the input job cannot be executed.

9. The image forming apparatus as recited in claim 1, wherein the second controller shows the job name list on the display on the basis of the job reference information stored on the main memory regardless of the judgment whether or not the one or more jobs can be executed.

10. A jobs display and execution method to be implemented by an image forming apparatus comprising a display and a main memory, the method comprising:

inputting one or more jobs each having job information and job reference information, the job information including image data to be subjected to job execution, the job reference information indicating job details including job name;

storing the job information and the job reference information temporarily on the main memory, upon the one or more jobs being input;

reading the job information out of the main memory to execute the one or more jobs;

judging whether or not the one or more jobs being input can be executed;

storing both the job information and the job reference information on the main memory, if it is judged that the one or more jobs can be executed or storing both the job information and the job reference information on the main memory, and further saves the job information on a recording device from the main memory, in the state the job information and the job reference information are connected with each other, if it is judged that the one or more jobs cannot be executed;

showing, in accordance with user manipulation, a job name list of the one or more jobs on the display on the basis of the job reference information stored on the main memory, the one or more jobs being unable to be executed; updating, in accordance with user manipulation, the job name list on the display on the basis of the job reference information stored on the main memory; and showing job details of a specific job name on the display on the basis of the job reference information stored on the main memory, the specific job name being selected by a user from the job name list; and restoring the job information on the main memory from the recording device to execute the one or more jobs, the one or more jobs becoming able to be executed after the job information is saved on the recording device from the main memory.

11. A non-transitory computer-readable recording medium having a jobs display and execution program for allowing a computer of an image forming apparatus comprising a display and a main memory, to execute:

inputting one or more jobs each having job information and job reference information, the job information including image data to be subjected to job execution, the job reference information indicating job details including job name;

storing the job information and the job reference information temporarily on the main memory, upon the one or more jobs being input;

reading the job information out of the main memory to execute the one or more jobs;

judging whether or not the one or more jobs being input can be executed;

storing both the job information and the job reference information on the main memory, if it is judged that the one or more jobs can be executed or storing both the job information and the job reference information on the main memory, and further saves the job information on a recording device from the main memory, in the state the job information and the job reference information are connected with each other, if it is judged that the one or more jobs cannot be executed;

showing, in accordance with user manipulation, a job name list of the one or more jobs on the display on the basis of the job reference information stored on the main memory, the one or more jobs being unable to be executed; updating, in accordance with user manipulation, the job name list on the display on the basis of the job reference information stored on the main memory;

and showing job details of a specific job name on the display on the basis of the job reference information stored on the main memory, the specific job name being selected by a user from the job name list; and restoring the job information on the main memory from the recording device to execute the one or more jobs, the one or more jobs becoming able to be executed after the job information is saved on the recording device from the main memory.

* * * * *